(No Model.)

C. P. LANCASTER.
WAGON BED.

No. 530,537. Patented Dec. 11, 1894.

Witnesses
G. M. Lamasure
C. A. Murphy

Inventor
Charles P. Lancaster
By Alexander & Davis
Attorneys

THE NORRIS PETERS CO., PHOTO-LITHO., WASHINGTON, D.C.

UNITED STATES PATENT OFFICE.

CHARLES P. LANCASTER, OF JONESBOROUGH, INDIANA.

WAGON-BED.

SPECIFICATION forming part of Letters Patent No. 530,537, dated December 11, 1894.

Application filed March 10, 1894. Serial No. 503,162. (No model.)

*To all whom it may concern:*

Be it known that I, CHARLES P. LANCASTER, a citizen of the United States, residing at Jonesborough, in the county of Grant and State of Indiana, have invented certain new and useful Improvements in Wagon-Beds, of which the following is a specification, reference being had therein to the accompanying drawings, in which—

Figure 1:
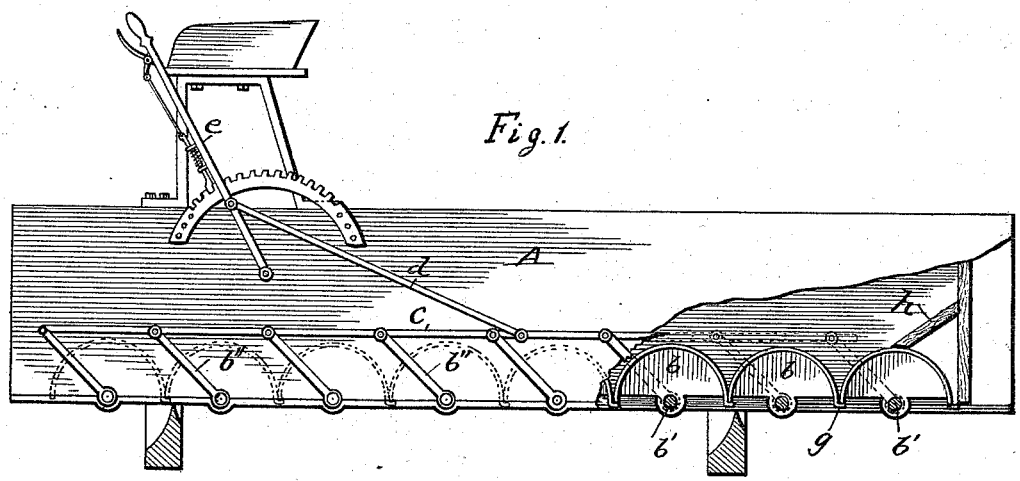
Figure 2:
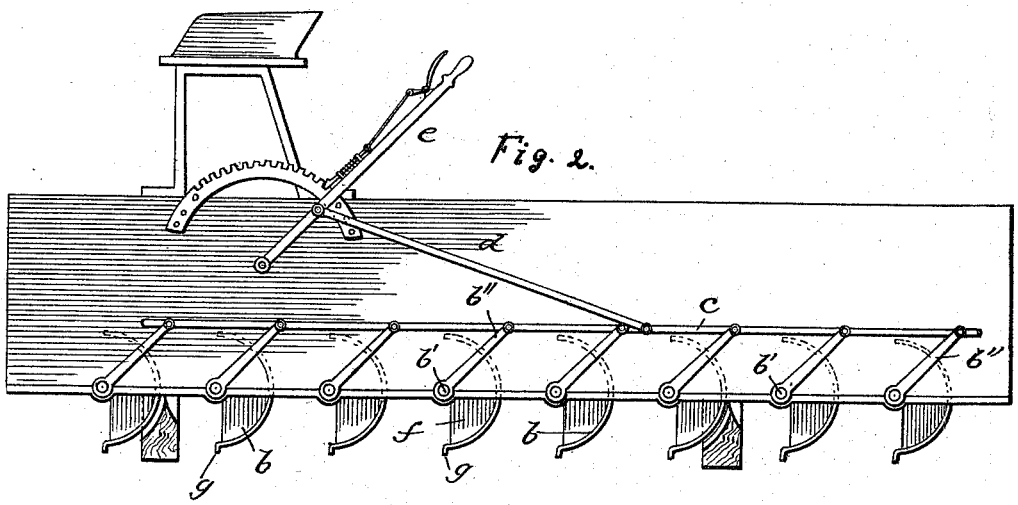

Figure 1 is a side elevation of a wagon body, partly in section, showing the bed closed; Fig. 2, a similar view showing the bed open, and Fig. 3 a detail inverted perspective of one of the transverse semi-cylindrical plates or bars comprising the bed.

This invention has relation to that class of wagon beds which are composed of a series of transverse bars or plates pivotally supported at their ends in the wagon body and adapted to be turned on their pivots to discharge the loose material (usually gravel); and it has for its object, essentially to so construct the pivoted plates or bars and so mount them in the wagon body that they may be opened and closed with greater ease, as more fully hereinafter set forth.

In the drawings, A designates a wagon body of any suitable construction, and $b$ the transverse bars or plates composing the bed, these bars being provided with journals $b'$ at their ends, these journals resting in suitable bearings in the sides of the wagon body.

At one side of the wagon the journals $b'$ are extended beyond their bearings and are provided with the upwardly extending crank arms $b''$, which are connected together by a horizontal rod $c$.

The rod $c$ is reciprocated, to turn the bed-bars on their pivots, by means of a rod $d$ pivotally connected to rod $c$ and to the operating-lever $e$, this lever being held in its adjusted position by means of a spring bolt and a suitable rack-segment or by other suitable means.

Each of the bed-bars is formed semi-cylindrical in cross section, the convexed side being the upper one. The curvature of the convexed side of each bar is struck from the center of its pivots or journals $b'$, and the bars are arranged close together so that when in a closed position their longitudinal edges will come close together or abut and form a continuous closed surface for the gravel or other material to rest upon.

Figure 3:
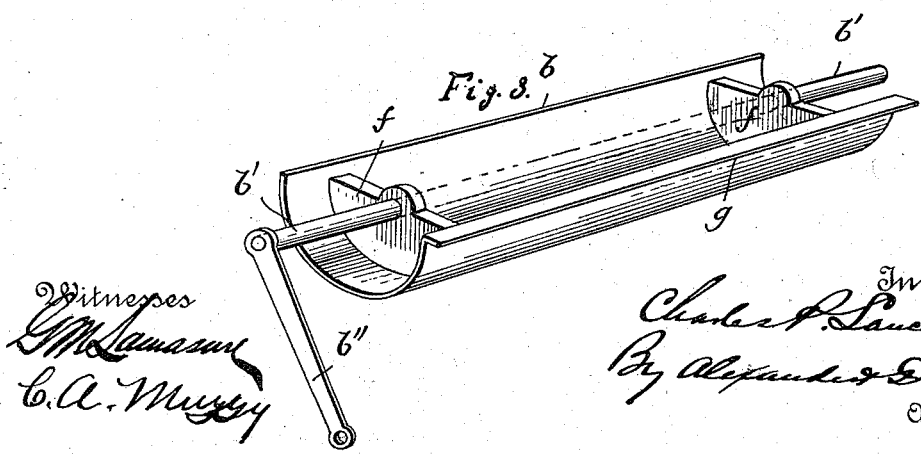

The bed-bars may be formed in any suitable manner, but I prefer the construction shown most clearly in Fig. 3, in which the bar is constructed of a light semi-cylindrical shell opened along its lower side and provided with suitable blocks $f$ in its ends to support the journals $b'$.

The journals $b'$ may consist simply of short pivots projecting from the ends of the bars (or blocks $f$), as shown in full lines in Fig. 3, or they may be formed on the ends of a continuous shaft extending entirely across the wagon body, as shown in dotted lines in Fig. 3.

Formed on one longitudinal edge of each bed-section is a flange $g$, which extends laterally and engages under the adjacent, unflanged edge of the adjoining section or bar.

As is obvious, when it is desired to dump the material, it is simply necessary to throw the operating-lever backwardly and thereby rotate the bars or sections simultaneously on their pivots and throw them to the position shown in Fig. 2; and when it is desired to close the bed the operating-lever is thrown forward and the sections are turned back to the position shown in Fig. 1, in which position their straight lower sides lie in substantially the same horizontal plane.

The advantage in transversely convexing the upper sides of the sections is that the sections will rock on their pivots in the act of dumping without lifting the material, whereby the entire series of sections may be rocked or opened with ease.

The curvature of the sections may be somewhat less than a semi-circle without departing from the spirit of the invention, but in order that there shall be no lifting of the material whatever it is evident that the curvature of the sections should be equal to an arc of a circle struck from the center of the journals.

The longitudinal flanges $g$ serve not only to hold the sections in alignment, but also to assist the operator in opening the bed, as it is obvious that as soon as the sections are partially opened the loose material will strike the flanges and by its weight assist in rocking them. As will be seen these flanges are formed on the edges of the sections that swing down when the bed is opened.

Within the wagon-body, at each end thereof is placed an inclined board or block $h$, which extends transversely of the wagon body and inclines downwardly and inwardly so as to prevent the loose material from entering the space between the end of the wagon-body and the adjacent section.

Should it be desired to use the wagon for purposes other than carrying loose material, thin planking may be readily laid upon the convexed surfaces of the sections without injuring them.

Having thus fully described my invention, what I claim is—

1. The combination of a vehicle-body, a bed therefor consisting of a series of parallel sections pivoted at their ends and having their upper sides curved to correspond substantially with the arc of a circle struck from the center of the pivots, and means for operating said sections or bars, substantially as described.

2. The combination of a wagon-body, a bed composed of a series of rocking sections transversely curved on their upper sides, each of said sections being provided with a longitudinal flange engaging under the longitudinal edge of the adjacent section, and means for rocking the sections, substantially as described.

In testimony whereof I affix my signature in presence of two witnesses.

CHARLES P. LANCASTER.

Witnesses:
ASBURY CRABB,
C. V. CAMPBELL.